United States Patent [19]

Comper et al.

[11] 4,359,340

[45] Nov. 16, 1982

[54] TIRE CURING BLADDER LUBRICANT

[75] Inventors: Louis F. Comper; Robert F. Scheiderich, both of Danville, Va.

[73] Assignee: The Goodyear Tire & Rubber Company, Akron, Ohio

[21] Appl. No.: 208,612

[22] Filed: Nov. 20, 1980

[51] Int. Cl.$^3$ ............................................... B28B 7/36
[52] U.S. Cl. .............................. 106/38.22; 106/38.24; 106/287.14; 106/287.16; 252/49.5
[58] Field of Search ........... 106/38.22, 287.14, 287.16, 106/38.24; 252/28, 49.5; 260/29.2 M

[56] References Cited

U.S. PATENT DOCUMENTS

| 4,018,564 | 4/1977 | Wright | 106/287.13 |
| 4,100,124 | 7/1978 | Ichikawa et al. | 260/29.2 M |
| 4,184,880 | 1/1980 | Huber et al. | 106/287.14 |

*Primary Examiner*—Lorenzo B. Hayes
*Attorney, Agent, or Firm*—H. C. Young, Jr.

[57] ABSTRACT

An aqueous lubricating composition for tire curing bladders containing polydimethylsiloxane, methyl hydrogen or methyl trimethoxy silane, a surfactant and optionally a metal salt of an organic acid.

5 Claims, No Drawings

TIRE CURING BLADDER LUBRICANT

FIELD OF THE INVENTION

This invention relates to tire curing bladder lubricant compositions, tire curing bladders having an outer coating of such lubricant composition, and a method of curing tires utilizing such a coated bladder.

BACKGROUND OF THE INVENTION

Conventionally, pneumatic rubber vehicle tires are produced by molding and curing a green, or uncured and unshaped, tire in a molding press in which the green tire is pressed outwardly against a mold surface by means of an inner fluid expandable bladder. By this method the green tire is shaped against the outer mold surface which defines the tire's tread pattern and configuration of sidewalls. By application of heat the tire is cured. Generally, the bladder is expanded by internal pressure provided by a fluid such as hot gas, hot water and/or steam which also participates in the transfer of heat for curing or vulcanization purposes. The tire is then allowed to cool somewhat in the mold, sometimes aided by adding cold or cooler water to the bladder. Then the mold is opened, the bladder collapsed by removal of its internal fluid pressure and the tire removed from the tire mold. Such use of the tire curing bladders is well known to those having skill in such art.

It is recognized that there is a substantial relative movement between the outer contacting surface of the bladder and the inner surface of the tire during the expansion phase of the bladder prior to fully curing the tire. Likewise there is also a considerable relative movement between the outer contacting surface of the bladder and the cured inner surface of the tire after the tire has been molded and vulcanized during the collapse and the stripping of the bladder from the tire.

Unless adequate lubrication is provided between the bladder and the inner surface of the tire there is typically a tendency for the bladder to buckle, resulting in a misshaping of the tire in the mold and also excessive wear and roughening of the bladder surface itself. Also, the bladder surface can tend to stick to a tire's inner surface after the tire is cured and during the bladder collapsing part of the tire cure cycle. Further, air bubbles can potentially become trapped between the bladder and tire surfaces and promote tire vulcanizing defects due to lack of adequate heat transfer.

For this reason, it is a conventional practice to precoat the inner surface of the green or uncured tire with a lubricant in order to provide lubricity between the outer bladder surface and inner tire surface during the tire shaping and molding operation. Sometimes the lubricant has been called a lining cement. Conventionally, the inner surface of the green tire, which is typically a rubber gum stock, is simply spray-coated in a confined, ventilated, spray booth, with a lubricant which might, for example, be based upon a silicone polymer. Other additives may also conventionally be utilized in the lubricant composition such as mica, polymeric polyols, cellulose ethers, clay such as bentonite clay and the like. Some lubricants are solvent based and some are water based. Often aqueous soap solutions are utilized. Many lubricant compositions have been taught in the art for such purposes.

However, a conventional practice of spray-coating the inner surface of the green tire with a lubricant composition can result in a relatively high labor intensive operation which can add appreciably to the cost of producing the tire. The tire must be transported to and from the spray booth and time must be allowed for the spray-lubricant coat to dry. Therefore, it is desired to provide an enhanced lubrication system as a composition and use therefore for molding or shaping and curing of green tires.

DISCLOSURE AND PRACTICE OF INVENTION

In accordance with this invention, a lubricant composition is provided as the product of a mixture which comprises:

(A) about 20 to about 40, preferably about 25 to about 35, parts by weight polydimethylsiloxane characterized by having a viscosity in the range of about 12 to about 28, preferably about 15 to about 25, million centistokes at 25° C.;

(B) about 35 to about 70, preferably about 45 to about 60 parts by weight of at least one silane selected from (i) a methyl hydrogen silane characterized by having a viscosity in the range of about 20 to about 40 centistokes at 25° C., (ii) dimethyl hydrogen silane characterized by having a viscosity in the range of about 80 to about 120 centistokes at 25° C., and (iii) a methyl trimethoxy silane;

(C) optionally about 3 to about 12, preferably about 5 to about 10 parts by weight of a metal salt of an organic acid selected from at least one of zinc, magnesium, manganese and cobalt acetates, stearates, propionates, glutionates and octoates; and (D) about 10 to about 25, preferably about 15 to about 20 parts by weight surfactant(s).

The composition for application to the bladder surface is an aqueous emulsion, or dispersion of the composition. For example, the composition for such application also contains (E) about 500 to about 1500, preferably about 600 to about 800 parts by weight water which, after application to the bladder, is dried by evaporation. Certainly more water could be used, although additional dilution of the composition should reduce the efficiency of its application.

It is generally preferred that the polydimethylsiloxane of (A) is hydroxyl capped as an ingredient (precursor) in preparing the composition.

Generally, the methyl hydrogen silane or mixture of methyl hydrogen silane and dimethyl hydrogen silane, (e.g. in weight ratios of 20/80 to 80/20), is preferred for (B).

Although the action of the metal salt of the organic acid is not completely understood, apparently it acts somewhat as a catalyst. Its use is optional since it has been observed that the lubricant composition could set up rather easily and adequately without this compound. Zinc acetate and/or zinc stearate is generally preferred for this purpose, although magnesium, manganese and cobalt acetates should also be suitable to a more or less degree as well as zinc propionate and zinc glutinate.

It is to be appreciated that various relatively well known defoaming agents and various stabilizers can also be used in the composition of this invention which are generally well known to those having skill in the pertaining art.

In further accordance with this invention, an expandable rubber tire-curing bladder having such a coating composition thereon (particularly after water removal) is provided. In practice, the rubber for the bladder is typically a butyl or butyl-type rubber (copolymer of isoprene and isobutylene). By the term butyl-type, it is intended to mean various modified basic butyl rubbers such as halogen-substituted butyl rubbers which may be, for example, chlorobutyl or bromobutyl rubber.

In still further practice of this invention, a method of preparing a pneumatic or semi-pneumatic rubber tire is provided in which a green tire is placed in a tire mold, the coated expandable bladder of this invention positioned therein, the mold closed and bladder expanded by application of internal hot fluid pressure to force the tire outward against the mold surface to shape and cure the tire followed by opening the mold, collapsing the bladder and removing the shaped and cured tire.

In more detail, for example, such a method of molding a pneumatic or semi-pneumatic tire which comprises the steps of:

(A) providing or building a green tire with elements which are to be its outer tread for ground-contacting purposes, two spaced intensible beads, sidewalls extending radially outwardly from said beads to join said tread, supporting carcass with reinforcing elements, and an inner surface of rubber gum stock;

(B) inserting said green tire into a tire mold press and positioning a coated tire cure bladder of this invention inside of said green tire, said bladder being attached to an internal portion of said tire press;

(C) closing the tire mold and expanding said coated tire cure bladder by internal, heated fluid outwardly against the inner gum stock surface of said tire to press the tire outward under conditions of heat and pressure to shape and cure said tire;

(D) opening the tire mold, collapsing said bladder and removing the cured tire having a generally toroidal shape therefrom.

The term "pneumatic tire" relates to tires which rely on an internal fluid, such as air under pressure in their tire cavity for their proper operation when mounted on a rim and the term "semi-pneumatic" tire relates to tires which contain an internal fluid, such as air, in their cavity but do not totally rely on its pressure for its proper operation when mounted on a rim.

In the practice of this invention, the aqueous emulsion or dispersion of the lubricant composition can conveniently be provided by the method which comprises:

(A) mixing 20 to about 40, preferably about 25 to about 35 parts by weight of the polydimethylsiloxane with about 35 to about 70, preferably about 45 to about 60 parts by weight of at least one of the methyl hydrogen silane, dimethyl hydrogen silane or methyl trimethoxy silane, about 500 to about 1500, preferably about 600 to about 800 parts by weight water (a portion of the water actually being added as a mixture with the silane(s)) and optionally, about 3 to about 12, preferably about 5 to about 10 parts by weight of said metal salt of an organic acid (generally a portion of the water is pre-mixed with the salt);

(B) optionally mixing therewith about 0.2 to about 1.0 parts by weight defoaming agent (which might be, for example, a defoamer silicone of the dimethylpolysiloxane emulsion in water); and (C) optionally, mixing therewith about 2 to about 10 parts by weight stabilizer (for increased stability of the emulsion or dispersion).

The aqueous emulsion or dispersion is simply coated, such as by spray-coating, onto the bladder and dried by evaporation at a temperature, for example, in the range of about 20° C. to about 110° C. It is preferred that the bladder is from about 80 to about 150 percent of its tire curing expanded position or condition for this coating purpose (as opposed to being deflated or collapsed), although it is not considered necessary and bladders have been successfully coated in a somewhat deflated condition.

It should be pointed out that various silicone or siloxane-based aqueous emulsion or dispersion lubricant compositions were previously formulated and evaluated as cure bladder coatings. Indeed, such a composition was earlier tried containing a polydimethylsiloxane polymer or mixture of such polymers of different molecular weights and viscosities. In such compositions it was found by experience that when utilizing a coating thereof on a rubber bladder, only about four to six tires could be molded from such bladder (4 to 6 tire cure cycles) for the single siloxane fluid composition or maybe 10 to 15 cycles from the dual siloxane polymer composition until excessive adhesion between the contacting outer surface of the bladder and the inner surface of the tire was experienced, as evidenced by their tendency to excessively stick together upon collapse of the bladder after curing the tire.

Organic solvent based silicone compound-contacting lubricant compositions were also evaluated. However, difficulties were experienced because apparently the organic solvent in the composition eventually damaged or degraded the rubber surface of the bladder itself. The organic solvent itself presented potential flammability and toxicity problems. Moreover, the evaulated organic solvent-based coating compositions on the cure bladder were observed to effectively last only about 4 to 6 tire cure cycles until it was considered necessary or advisable to recoat the bladder surface. Such frequency of recoats is considered of marginal economical benefit when taken or coupled with the attendant potential hazards.

Upon utilizing the coating composition of this invention on a tire cure bladder, it was observed that about 14 to about 30 truck tires, and sometimes even more, could be shaped and molded with the bladder (or 14 to 30 cure cycles) before excessive adhesion between the bladder and cured tire surfaces was experienced.

The practice of this invention is further illustrated by reference to the following example which is intended to be representative rather than restrictive of the scope of the invention. Unless otherwise indicated, all parts and percentages are by weight.

EXAMPLE I

A lubricant composition was prepared according to the following recipe shown in Table 1.

TABLE 1

| Material | Parts |
| --- | --- |
| Polydimethylsiloxane, hydroxyl capped[1] | 40.4 |
| Methyl hydrogen silane (30%)[2] | 175.0 |
| Zinc acetate/stearate (20%)[3] | 43.7 |
| Defoamer[4] | 1.3 |
| Water | 610.8 |

[1]Reported to be a polydimethylsiloxane having a viscosity in the range of about 20 million centistokes as a mixture comprised of 30.7 parts of the siloxane and 10.9 parts surfactant therefor.
[2]Reported to be a mixture consisting of (a) 30 weight percent of a mixture of methyl hydrogen silane having a viscosity of about 30 centistokes at 25° C. and dimethyl hydrogen silane having a viscosity of about 100 centistokes at 25° C. and (b) 70 weight percent water.
[3]Reported to be a mixture comprised of (a) 20 weight percent of a mixture of zinc acetate and zinc stearate and (b) 80 weight percent water.
[4]The optional defoamer can be of a dimethylpolysiloxane emulsion in water composition which is beneficial because it prevents or inhibits foam formation during mixing.

The aqueous emulsion or dispersion was prepared according to the following method:

(A) Add the polydimethylsiloxane to the water with relatively low shear mixing at 1000 rpm in a Cowles mixer to form a water emulsion.

(B) Add the defoamer.

(C) Slow mix at 500 rpm and add the methyl hydrogen silane and dimethyl hydrogen silane aqueous mixture.

(D) Add zinc acetate/zinc stearate aqueous mixture.

The mixture was sprayed on the outer surface of the rubber tire curing bladder in its somewhat collapsed condition. The coating was allowed to dry at about 80° C. The coating was re-applied after about 10 to 15 tire cure cycles with maximum of about 24 hours between coating applications.

Upon spraying the mixture on a hot bladder surface, the methyl hydrogen silane mixture apparently reacts with the polydimethylsiloxane to form a somewhat cured silicone polymer on the surface of the bladder.

The coating was dried for about a minute on the hot (80° C.) bladder surface to form the lubricant composition coating thereon.

The bladder itself was of the butyl rubber type of a generally toroidal shape with an overall, expanded condition diameter of about 39 inches and tubular diameter of about 10 inches. Its surface had been pre-treated by washing with a hydrocarbon solvent, followed by drying, to remove surface oils and the like.

A radial ply green tire was fabricated of the 11 R 22.5 size.

The tire was placed in a tire mold press and the coated bladder, attached to the mold, inserted inside the tire. The mold was closed and the bladder was expanded by steam at a temperature of about 190° C. to force it against the inside surface of the tire and press the tire outwardly against the outer mold surface so that the tire was shaped as desired and cured.

The mold was then opened, the bladder collapsed and the tire removed therefrom. By this procedure it was observed that about 20 to about 30 tires could be molded from the bladder within about a 24 hour period (cure cycles) before it was necessary to recoat the bladder with the lubricant composition.

Generally, recoating is considered necessary when the bladder excessively sticks to the inner surface of precured tire when the expanded bladder is collapsed or collapsing after the curing operation.

It is recognized that the inner surface of the tire is typically a compounded rubber gum stock which can be of various rubber or their mixtures such as natural rubber, cis 1,4-polyisoprene, cis 1,4-polybutadiene, butadiene-styrene copolymer, butyl rubber, holobutyl rubber such as chlorobutyl and bromobutyl and EPDM (ethylene-propylene-minor amount of diene terpolymer).

In this example, preparation of a radial ply tire is exemplified. Although the invention can sometimes be considered to be more adaptable to radial ply rather than to bias ply tire production because the bladders are generally required to expand more during a bias ply tire cure cycle, thereby stressing the bladder's surface coat, it is considered that the invention is generally readily adaptable to bias ply tire production.

It is important to appreciate that the tire in this Example was prepared by expanding the coated bladder directly against the inner gum stock surface of the tire to press the tire outward under conditions of heat and pressure to shape and cure the tire. Thus, the coated bladder effectively enabled the preparation of the tire without application of a lubricant coating or liner cement, on the inner surface of the green tire. This is considered significant since it adequately demonstrated that the coated bladder of this invention provided adequate lubrication for a series of sequential tire cure cycles under conditions of heat and pressure, expansion and contraction without the conventional, attendant tire liner cement, or lubricant, pre-coated on the inside surface of the tire. It is reasonably considered that this will result in a considerable savings of labor and material in the preparation of a pneumatic tire. Although it is appreciated that a lubricant pre-coat could be used on the inner surface of the green tire, if desired, in conjunction with the coated bladder, it is considered important that this Example demonstrated that it was not required.

While certain representative embodiments and details have been shown for the purpose of illustrating the invention, it will be apparent to those skilled in this art that various changes and modifications may be made therein without departing from the spirit or scope of the invention.

What is claimed is:

1. A lubricant composition comprising an aqueous emulsion consisting essentially of:
    (i) about 20 to about 40 parts by weight polydimethylsiloxane characterized by having a viscosity in the range of about 12 million to about 28 million centistokes at 25° C.;
    (ii) about 12 to about 20 parts by weight of at least one silane selected from (a) a methyl hyrogen silane, characterized by having a viscosity in the range of about 20 to about 40 centistokes at 25° C.,
    (b) dimethyl hydrogen silane characterized by having a viscosity in the range of about 80 to about 120 centistokes at 25° C. and (c) methyl trimethoxy silane;
    (iii) optionally, about 3 to about 12 parts by weight of a metal salt of an organic acid selected from at least one of zinc, magnesium, manganese and cobalt acetate, stearate, propionate and octoate;
    (iv) about 10 to about 25 parts by weight surfactant for said polydimethylsiloxane and
    (v) about 500 to about 1500 parts by weight water.

2. The lubricant composition of claim 1 where said polydimethylsiloxane is hydroxyl capped.

3. The compositionn of claim 2 where the silane is methyl hydrogen silane and/or dimethyl hydrogen silane.

4. The composition of claim 1 or 2 where said metal salt is zinc acetate and/or zinc stearate.

5. The lubricant composition of claim 2 where the silane is methyl hydrogen silane and/or dimethyl hydrogen silane and the metal salt is zinc acetate and/or zinc stearate.

* * * * *

UNITED STATES PATENT AND TRADEMARK OFFICE
CERTIFICATE OF CORRECTION

PATENT NO. : 4,359,340

DATED : November 16, 1982

INVENTOR(S) : Louis F. Comper and Robert F. Scheiderich

It is certified that error appears in the above-identified patent and that said Letters Patent is hereby corrected as shown below:

Column 6, line 37, Claim 1, subparagraph (ii), delete "12 to about 20", and insert therefore --35 to about 70--.

Signed and Sealed this

Twelfth Day of February 1985

[SEAL]

*Attest:*

DONALD J. QUIGG

*Attesting Officer*     Acting Commissioner of Patents and Trademarks